Figure 10:
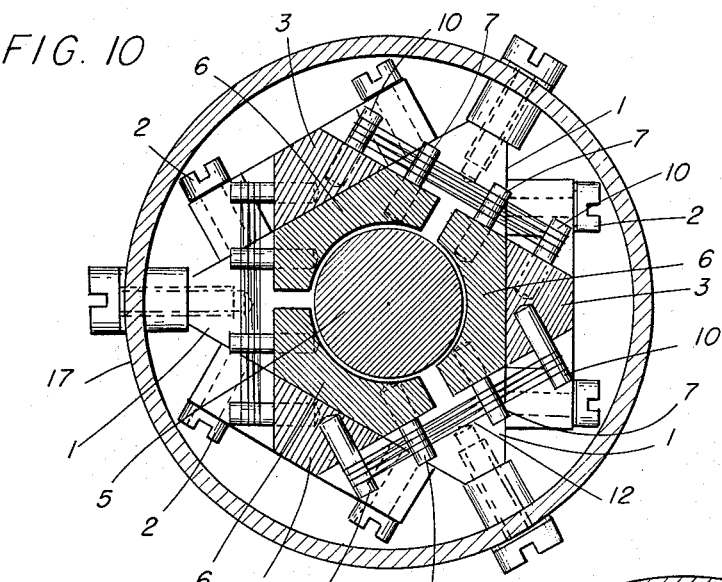

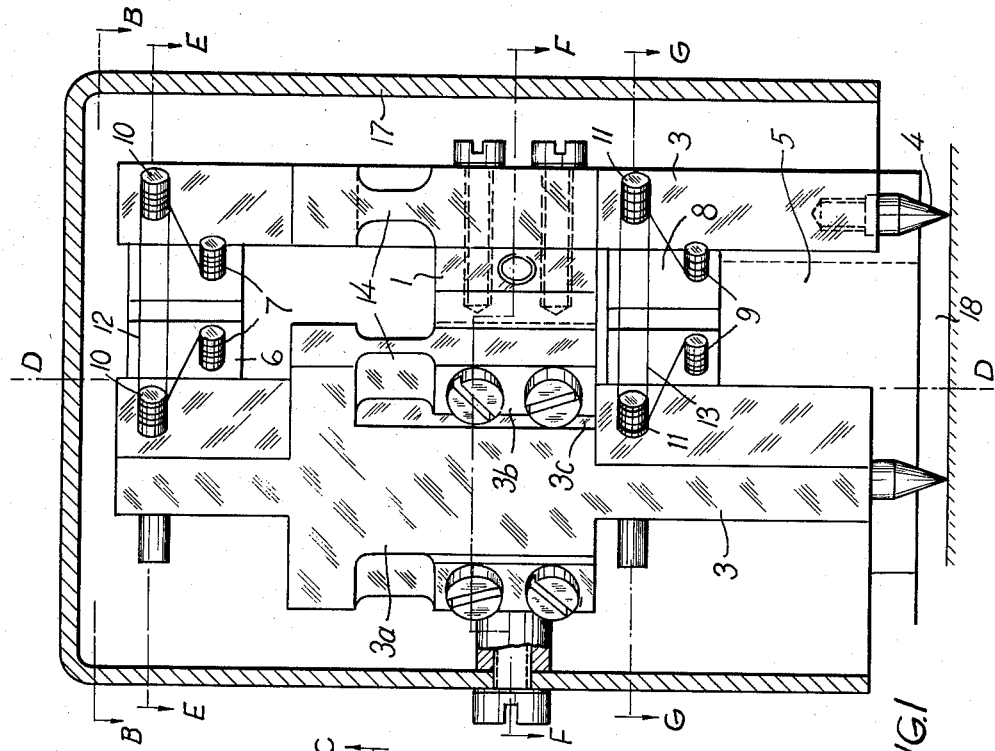
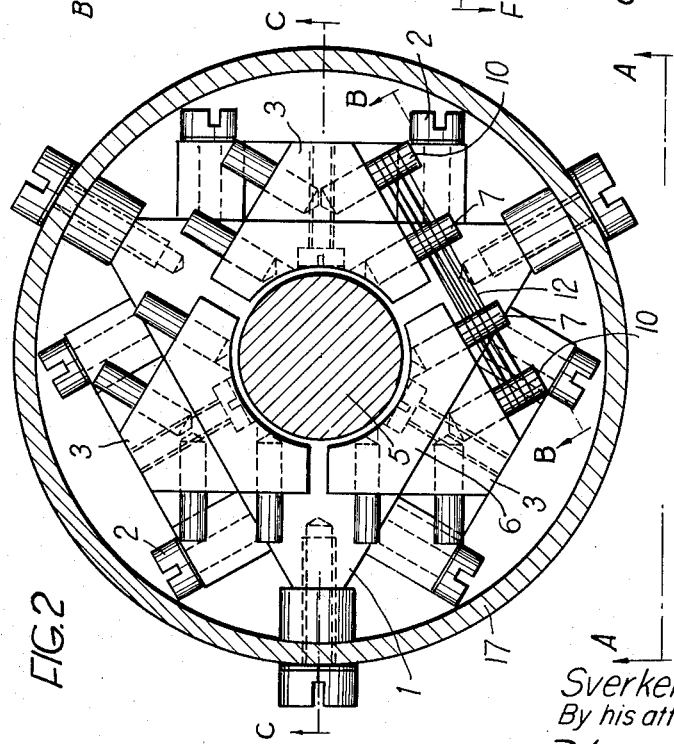

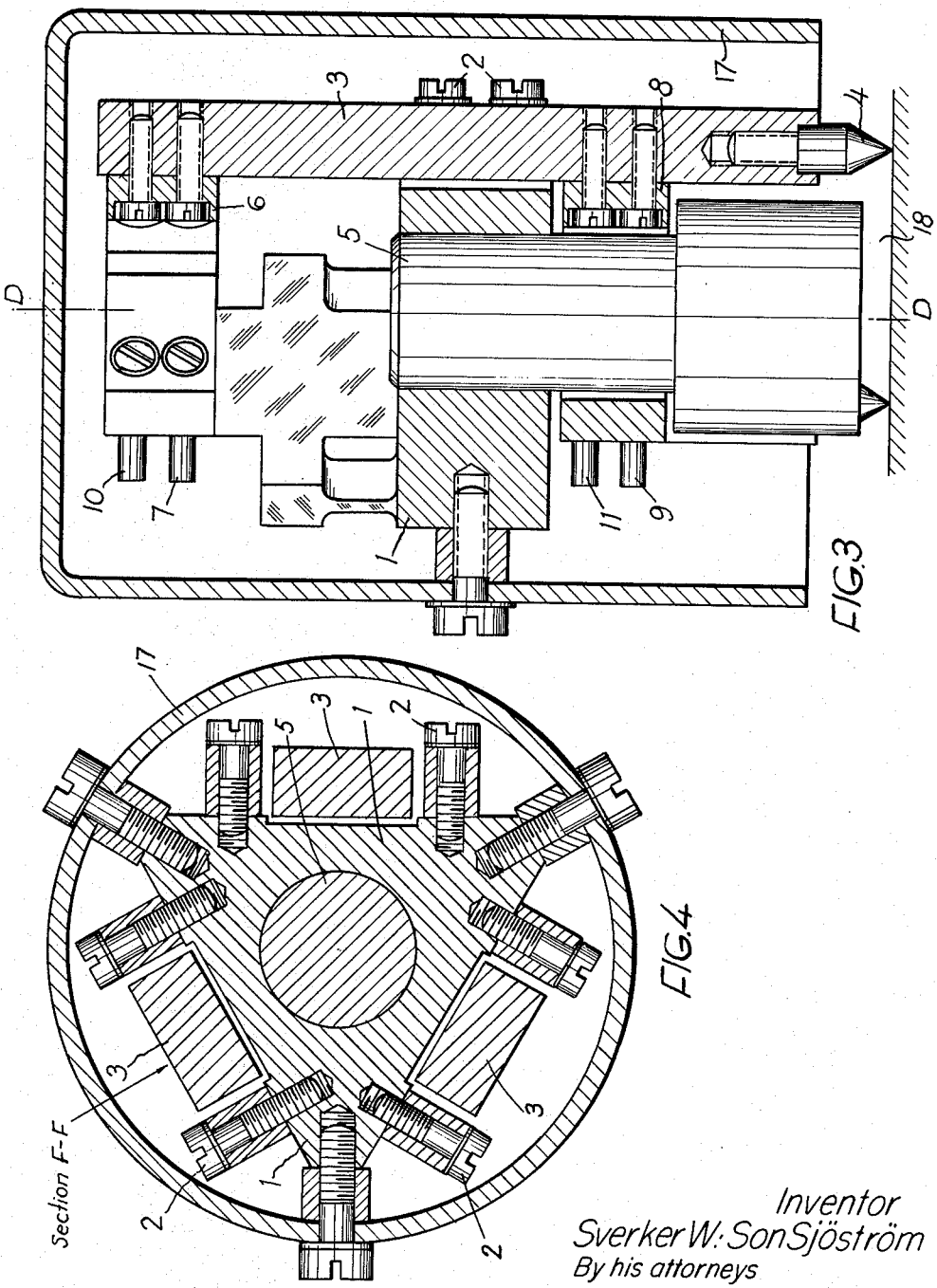

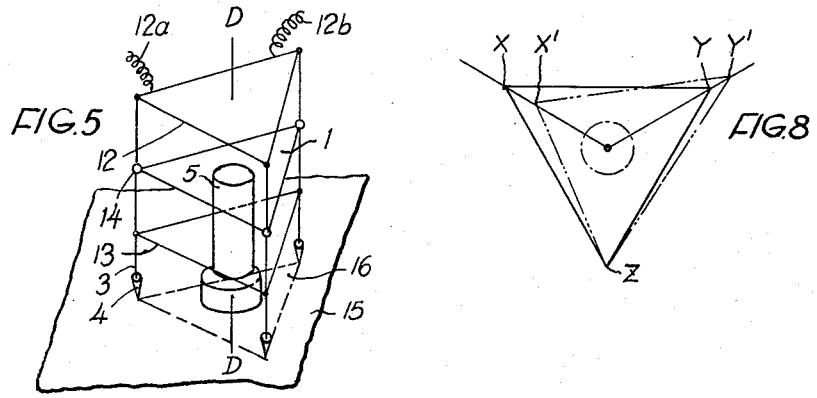
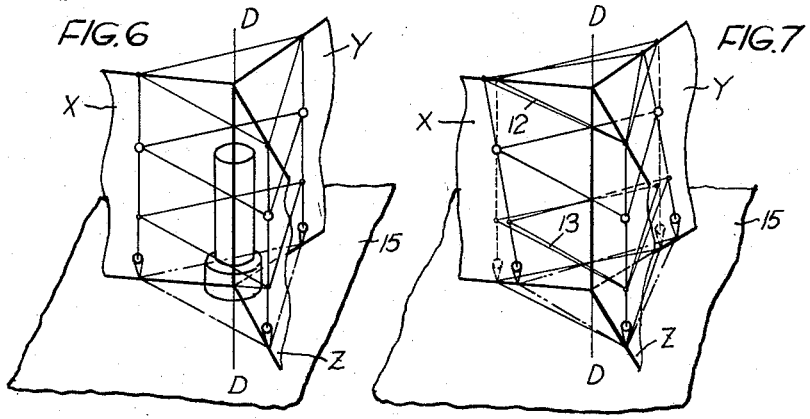
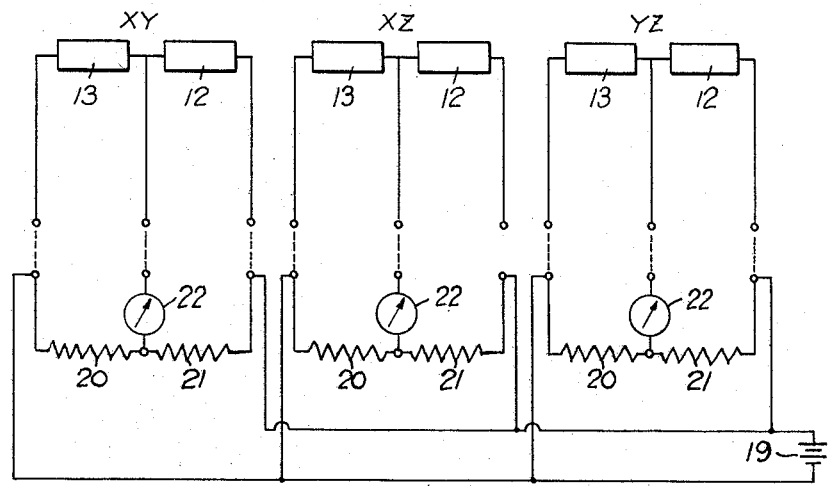

Sept. 26, 1961     S. W. SJÖSTRÖM     3,001,291
EXTENSOMETERS

Filed July 18, 1957     4 Sheets-Sheet 4

Inventor
Sverker W: Son Sjöström
By his attorneys

Howson and Howson

United States Patent Office 3,001,291
Patented Sept. 26, 1961

3,001,291
EXTENSOMETERS
Sverker W:son Sjöström, Varsta, Sweden, assignor to Aktiebolaget Scania-Vabis, Sodertalje, Sweden, a corporation of Sweden
Filed July 18, 1957, Ser. No. 672,751
Claims priority, application Sweden July 19, 1956
6 Claims. (Cl. 33—174)

This invention relates to extensometers for measuring strains and including a device comprising a central body part and angularly deflectible resilient legs which are movable within small limits relative to the central part and are provided with sharp indentors of a hard material for defining the length of a distance to be measured, the strains being measured along said distance. If an extension or contraction of the material to be tested occurs along said distance, the distance between the indentors of the legs will be altered, and the resulting movement of the legs is used to determine the strains on the material in a resistive, inductive or capacitive manner by means cooperating with said device.

Extensometers of conventional types are devised for measuring in a single direction and are accordingly provided with one or two angularly deflectible legs. Such extensometers can not be used for simultaneous measurements in different directions within a region to be tested. In order to place such a device steadily on a part to be tested, it must be provided with additional supports extending at right angles to the measuring-direction. In many cases, the device must further be provided with special attachment members, particularly in cases where it is to be placed on an inclined or downward-facing surface. It will be apparent that such extensometers have rather limited possibilities of use and are time-consuming in operation.

The main object of the invention is to provide an improved extensometer by means of which measurements can be made simultaneously in any desired direction within a triangular area confined by the indentors of the legs. Another object is to so devise the extensometer that it can be placed on any desired surface irrespective of the location thereof and can be easily moved to different places on the surface to be tested.

The above and further objects are attained by the mechanisms illustrated in the annexed drawings which show forms of construction comprising unbonded wire type sensing members, that is, in which the movements of the legs are transmitted to sensing members consisting of wires the cross-sectional area of which varies as a result of extensions or contractions of the material to be tested thereby to change the electrical resistance of the wires. For the sake of clearance, the embodiment of the invention is illustrated on an exaggerated scale in the drawings in which—

Figure 11:
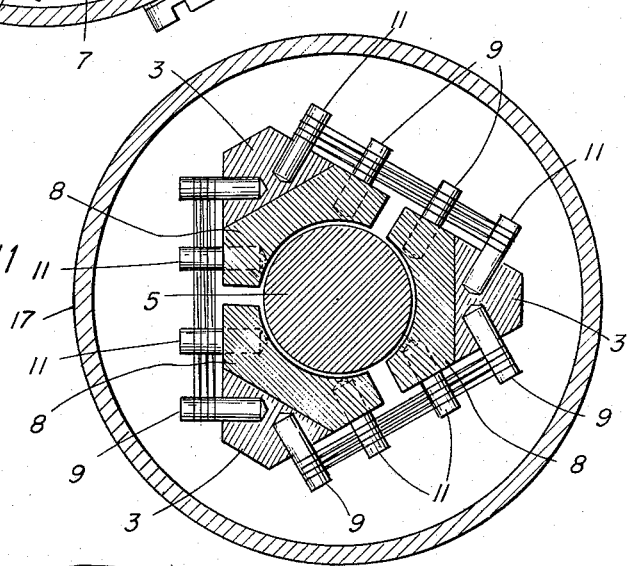
Figure 12:
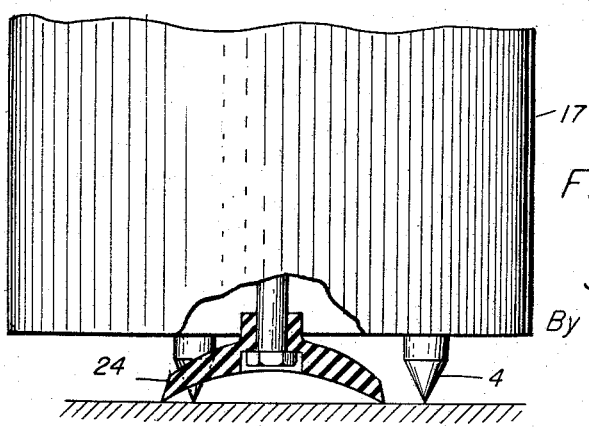

FIG. 1 is a view in elevation of the improved extensometer as viewed in the direction of the arrows A, FIG. 2, the protective cover of the extensometer being shown in section to make visible the parts housed therein. FIG. 2 is a sectional view along the line B—B, FIG. 1. FIG. 3 is a sectional view along the line C—C of FIG. 2. FIG. 4 illustrates partial sectional view taken at right angles to the axis D—D, FIGS. 1 and 3, and along the line F—F of FIG. 1. FIGS. 5–8 are diagrammatic views explaining the mode of operation of the extensometer, and FIG. 9 illustrates an electric wiring diagram forming part of the extensometer. FIG. 10 is a partial sectional view of the embodiment of FIGS. 1 and 3 taken at right angles to the axis D—D on the line E—E of FIG. 1, while FIG. 11 is a view similar to FIG. 10 taken on the line G—G of FIG. 1. FIG. 12 is a view of the bottom of a modified form of extensometer in which the device is fastened to the surface to be tested by a suction cup. The same reference numerals are applied to similar parts in the various figures.

The embodiments described is assumed to be placed on a horizontal, upward-facing surface, as shown in FIGS. 1 and 3. However, it will be obvious from the following description that the device may be placed in any desired position and that any indications as to the location of the parts with reference to FIGS. 1 and 3 only refer to the actual location shown in the drawing.

Referring to FIGS. 1 to 4, numeral 1 denotes a central body part which by means of screws 2 is connected with legs 3 which at their lower ends have sharp indentors 4. Above the central part 1, the upper end of each leg 3 is rigidly connected with an insulator 6 which faces the central axis D—D of the device and has mounted thereon projections or pegs 7. Below the central part, 1, each leg 3 is connected with a similar insulator 8 having pegs 9. The pegs 7 and 9 are located in such a manner that they are parallel to each other on two adjacent insulators, (see FIGS. 2 and 4). Near their upper ends the legs 3 also have pegs 10 which are parallel to each other on two adjacent legs. Below the central part 1, the legs 3 have pegs 11 which also are parallel to each other on two adjacent legs.

Around each pair of upper parallel pegs 10 and around each pair of lower parallel pegs 11 there is wound a sensing member consisting of a wire 12 and 13, respectively, each of said wires comprising substantially parallel prestressed parts extending between the pegs. The ends of the sensing wire 12 wound around two pegs 10 are secured to two pegs 7 projecting from adjacent insulators 6. In a similar manner, the ends of a sensing wire 13 wound around two pegs 11 are secured to pegs 9 on two adjacent insulators. The pegs 10 and 11 consist of aluminium and are oxidized at their surfaces to insulate the sensing wires from the legs. The wires are glued to the legs 10, 11 and 7, 9 to prevent them from sliding thereon.

The three upper sensing members 12 interconnect the upper ends of the three legs 3, whereas the three lower sensing members 13 interconnect the lower ends of the legs. The ends of the wires at the pegs 7 and 9 are connected to wires which extend outwards through the cover 17 to a reading-instrument or recording-instrument. The last-named wires are not shown in FIGS. 1 to 4, but are illustrated in FIGS. 5 and 9 to be described later on in connection with the mode of operation.

When not acted upon by any forces, the legs 3 screwed to the central part 1 are parallel to the central longitudinal axis D—D and to each other. The legs are devised such as to be resiliently deflectible to a slight extent in planes extending through the central axis D—D. To this end each leg 3 has two weakened parts 14 serving as the centers of angular movement and connecting the parts 3b of the legs rigidly screwed to the central part 1 with the movable main parts 3a of the legs. By means of vertical slots 3c, the parts 3b and 14 are partly spaced apart from the parts 3a to permit the desired movement of the last-named parts. The legs are deflectible independently of each other.

The central part 1 is provided with a downwardly extending permanent magnet 5 the lower end of which is located above the surface to be tested upon which the device is placed and which consequently is contacted only by the three indentors 4. Between the magnet 5 and the supporting surface there is an air gap 18 which should be as small as possible. An extensometer provided with a magnet can obviously be used only for testing materials having magnetic properties. Due to the attraction between the magnet and the supporting surface the indentors will be pressed sufficiently hard against the surface to prevent sliding movement thereon.

For measurements of a non-magnetic surface the extensometer may be provided with a downwardly open vacuum chamber, and a rubber ring may be used as a sealing member between the chamber and the surface. If a vacuum is created in the chamber, the indentors will be pressed against the surface under the action of the atmospheric pressure. This type of attaching means is illustrated in FIG. 12 of the drawings and may consist of a rubber cup 24.

The mode of operation of the extensometer according to the invention will now be explained with reference to the diagrammatic perspective views shown in FIGS. 5 to 7 and with reference to FIG. 8. FIG. 5 illustrates diagrammatically the main parts shown in FIGS. 1 to 4 in their approximate relative positions, numeral 1 indicating the central body, numerals 3 the legs, numerals 4 the indentors, and 14 the centers of angular movement of the legs corresponding to the weakened parts 14 in FIG. 1. Numerals 12 and 13 denote the upper and lower sensing wires, respectively. As previously mentioned, these wires are insulated from the legs 3. Wires 12a and 12b connect the sensing wires separately to reading instruments shown in FIG. 9.

In FIG. 5, the legs 3 are shown in their parallel positions. The indentors 4 rest on the surface 15 to be tested and are assumed to be located at the corners of an equilateral triangle 16.

FIG. 6 illustrates the parallel positions of the legs in separate planes X, Y and Z all of which extend through the common central axis D—D. As mentioned above, the legs 3 are movably merely in their respective plane X, Y or Z.

The surface 15 belongs to a machine part which for the measurement of strains is subjected to predetermined loads such as to cause tensile or compressive stresses in the surface which result in an extension or contraction of the surface around the region defined by the indentors. The indentors will move in accordance with the strains on the surface so as to alter their distances from each other, the changes in said distances as compared with the original spacing of the indentors corresponding to the occurring strains. In case of metals the relation between the deflections of the indentors and the strains is usually a linear one in accordance with the so called generalized Hooke's law. FIG. 7 illustrates to an exaggerated scale the angular movements of the X-leg and Y-leg in their respective planes during the measurement, the Z-leg being assumed to maintain its original position in its plane.

FIG. 8 illustrates the exemplified displacements of the indentors as viewed in a direction at right angles to the plane 15. The indentor of the X-leg has moved from X to X', and the indentor of the Y-leg has moved from Y to Y'.

FIG. 9 illustrates the wiring diagram of the extensometer and its reading-instruments. A common source 19 provides electric current for three measuring-bridges XY, XZ and YZ, said bridges being arranged in parallel with each other and comprising each an upper sensing member 12, a lower sensing member 13, resistors 20 and 21, respectively, and a reading-instrument 22.

In the example illustrated in FIGS. 7 and 8, the resistance of the sensing member XZ–12 will be increased, the resistance of the sensing member XZ–13 will be decreased, the resistance of the sensing member YZ–12 will be decreased, and the resistance of the sensing member YZ–13 will be increased, resulting in the flow of currents through the instruments XZ–22 and YZ–22. In the exemplified case no current will flow through the instrument XY–22 in spite of the angular movements of the X-leg and Y-leg in their respective planes X and Y, provided that the distance between the indentors of the X-leg and Y-leg has not been changed.

The strengths of the currents indicated by the instruments are then converted by computation into terms of deflections in three directions making angles of 120° relative each other. The deflections are then converted, in accordance with the relation between the deflections and strains, into corresponding principal strains the directions of which will also be known. For most metallic materials there is a linear relation between the strains and the deflections, and the following equations are obtained to compute the principal strains and their directions from the measured deflections, namely $$\sigma_1 = \frac{E}{3}\left\{\frac{1}{1-\gamma}(\epsilon_a + \epsilon_b + \epsilon_c)\right.$$

$$\left. + \frac{\sqrt{2}}{1+\gamma}\sqrt{(\epsilon_a - \epsilon_b)^2 + (\epsilon_b - \epsilon_c)^2 + (\epsilon_a - \epsilon_c)^2}\right\}$$

$$\sigma_2 = \frac{E}{3}\left\{\frac{1}{1-\gamma}(\epsilon_a + \epsilon_b + \epsilon_c)\right.$$

$$\left. - \frac{\sqrt{2}}{1+\gamma}\sqrt{(\epsilon_a - \epsilon_b)^2 + (\epsilon_b - \epsilon_c)^2 + (\epsilon_a - \epsilon_c)^2}\right\}$$

$$\tan 2\varphi a = \frac{\sqrt{3}(\epsilon_b - \epsilon_c)}{\epsilon_a - \epsilon_b + (\epsilon_a - \epsilon_c)}$$

in which $\sigma_1$ and $\sigma_2$ denote principal strains and $\epsilon_a$, $\epsilon_b$ and $\epsilon_c$ the measured deflections in the directions $a$, $b$ and $c$. $\varphi_a$ denotes the angles between the measuring-directions and the directions of the principal strains.

Although in the described embodiment sensing members of the resistive type are used, it will be obvious to those skilled in the art that the sensing members may be of the inductive or capacitive type. Other modifications may be made within the scope of the appending claims.

What is claimed is:

1. An extensometer including a device comprising a central body part and three deflectible legs connected to the body part and having indentors to be placed on a surface to be tested, means supported by the central body part for attaching the extensometer to the surface to be tested, all of said legs being independently deflectible in different non-parallel planes each in only one plane extending substantially at right angles to said surface, the said planes crossing each other along the central axis of the body part, said indentors being located at the corners of a triangle, whereby each leg is movable independently of the others but only in one plane and radial of said central axis; in combination with electric sensing members operatively connected between said legs at a distance from the centers of deflectible movement of the legs in order to be responsive to changes in the relative positions of the indentors.

2. An extensometer as set forth in claim 1, wherein said indentors are located at the corners of an equilateral triangle.

3. An extensometer as set forth in claim 1, wherein the legs have centers of angular movement for their deflection, said sensing members interconnect the legs above and below the centers of angular movement of the legs, and are of the unbonded wire strain gauge type.

4. An extensometer as set forth in claim 1, wherein the legs have centers of angular movement for their deflection, said sensing members interconnect the legs above and below the centers of angular movement of the legs, and are of the inductive type.

5. An extensometer as set forth in claim 1 and further comprising magnet means to fasten said device to the surface to be tested.

6. An extensometer as set forth in claim 1 in which the attaching means comprises a suction cup; whereby the indentors will be pressed against the surface under atmospheric pressure within the triangle defined by the indentors.

(References on following page)

References Cited in the file of this patent

UNITED STATES PATENTS

| | | | |
|---|---|---|---|
| 753,149 | Lankford | Feb. 23, 1904 |
| 828,608 | Keane | Aug. 14, 1906 |
| 2,119,076 | Dietrich | May 31, 1938 |
| 2,183,459 | Lehr | Dec. 12, 1939 |
| 2,316,975 | Ruge | Apr. 20, 1943 |
| 2,439,146 | Ruge | Apr. 6, 1948 |
| 2,553,668 | Morello | May 22, 1951 |
| 2,578,066 | Hyde | Dec. 11, 1951 |
| 2,607,990 | Payamps | Aug. 26, 1952 |
| 2,609,611 | Dickson | Sept. 9, 1952 |
| 2,659,972 | Norris | Nov. 24, 1953 |
| 2,666,262 | Ruge | Jan. 19, 1954 |
| 2,697,158 | Epstein | Dec. 14, 1954 |

FOREIGN PATENTS

| | | |
|---|---|---|
| 746,228 | Germany | June 19, 1944 |
| 13,639 | Germany | Mar. 15, 1956 |